US012795501B2

(12) United States Patent
Thubert et al.

(10) Patent No.: US 12,795,501 B2
(45) Date of Patent: Nov. 10, 2026

(54) LEVERAGING WIRELESS DIRECT TRANSMISSIONS

(71) Applicant: Cisco Technology, Inc., San Jose, CA (US)

(72) Inventors: Pascal Thubert, Roquefort-les-Pins (FR); Patrick Wetterwald, Mouans Sartoux (FR); J. P. Vasseur, Issy les Moulineaux (FR); Jerome Henry, Pittsboro, NC (US); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 18/328,377

(22) Filed: Jun. 2, 2023

(65) Prior Publication Data

US 2024/0163770 A1 May 16, 2024

Related U.S. Application Data

(60) Provisional application No. 63/383,270, filed on Nov. 11, 2022.

(51) Int. Cl.
*H04W 40/12* (2009.01)
*H04W 88/04* (2009.01)

(52) U.S. Cl.
CPC ............ *H04W 40/12* (2013.01); *H04W 88/04* (2013.01)

(58) Field of Classification Search
CPC ...... H04W 40/12; H04W 88/04; H04L 45/302
USPC ........................................................ 370/230
See application file for complete search history.

(56) References Cited

U.S. PATENT DOCUMENTS

| | | | | |
|---|---|---|---|---|
| 9,860,047 | B1 * | 1/2018 | Pawar | H04L 41/0816 |
| 10,075,217 | B1 * | 9/2018 | Sung | H04B 7/15507 |
| 2016/0112944 | A1 | 4/2016 | Zhou et al. | |
| 2017/0127344 | A1 * | 5/2017 | Liu | H04W 76/14 |
| 2019/0288908 | A1 | 9/2019 | Lee et al. | |
| 2020/0196191 | A1 | 6/2020 | Deparisse | |
| 2020/0329416 | A1 | 10/2020 | Taneja et al. | |
| 2022/0053406 | A1 * | 2/2022 | Lee | H04W 40/22 |
| 2022/0124857 | A1 | 4/2022 | Patil et al. | |
| 2022/0124858 | A1 | 4/2022 | Fang et al. | |

(Continued)

FOREIGN PATENT DOCUMENTS

WO 2021180541 A1 9/2021

OTHER PUBLICATIONS

International Search Report and Written Opinion for International Application No. PCT/US2023/079431, mailed Feb. 9, 2024, 13 Pages.

(Continued)

*Primary Examiner* — Asad M Nawaz
*Assistant Examiner* — Michael Wayne Maddox
(74) *Attorney, Agent, or Firm* — Merchant & Gould P.C.

(57) ABSTRACT

Leveraging wireless direct transmissions may be provided. It may be determined that data traffic flowing on a first pathway between a first client device and a second client device is not meeting a predetermined service level. The first pathway may be partially wired and partially wireless. A second pathway that will meet the predetermined service level may be determined. The second pathway may be wireless. The data traffic may be caused to flow on the second pathway.

20 Claims, 2 Drawing Sheets

(56) References Cited

U.S. PATENT DOCUMENTS

| | | | | |
|---|---|---|---|---|
| 2023/0300713 | A1* | 9/2023 | Hoang .................. | H04W 40/24 370/254 |
| 2024/0022963 | A1* | 1/2024 | Schwardmann .. | H04W 28/0942 |
| 2024/0298242 | A1* | 9/2024 | Horita ................... | H04W 40/12 |

OTHER PUBLICATIONS

International Search Report and Written Opinion for International Application No. PCT/US2023/071930 mailed Nov. 7, 2023, 15 Pages.

Xie Z., "Towards Efficient Retransmission in Dense Networks With Interference Correlation", IEEE Transactions on Communications, IEEE Service Center, Piscataway, NJ. USA, vol. 68, No. 10, Jul. 8, 2020, pp. 6374-6387, XP011814993, p. 3, section D, first column p. 3, equation 3 column 2, section IV, par. 1.

* cited by examiner

LEVERAGING WIRELESS DIRECT TRANSMISSIONS

RELATED APPLICATION TECHNICAL FIELD

Under provisions of 35 U.S.C. § 119(e), Applicant claims the benefit of U.S. Provisional Application No. 63/383,270 filed Nov. 11, 2022, which is incorporated herein by reference.

TECHNICAL FIELD

The present disclosure relates generally to leveraging wireless direct transmissions.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
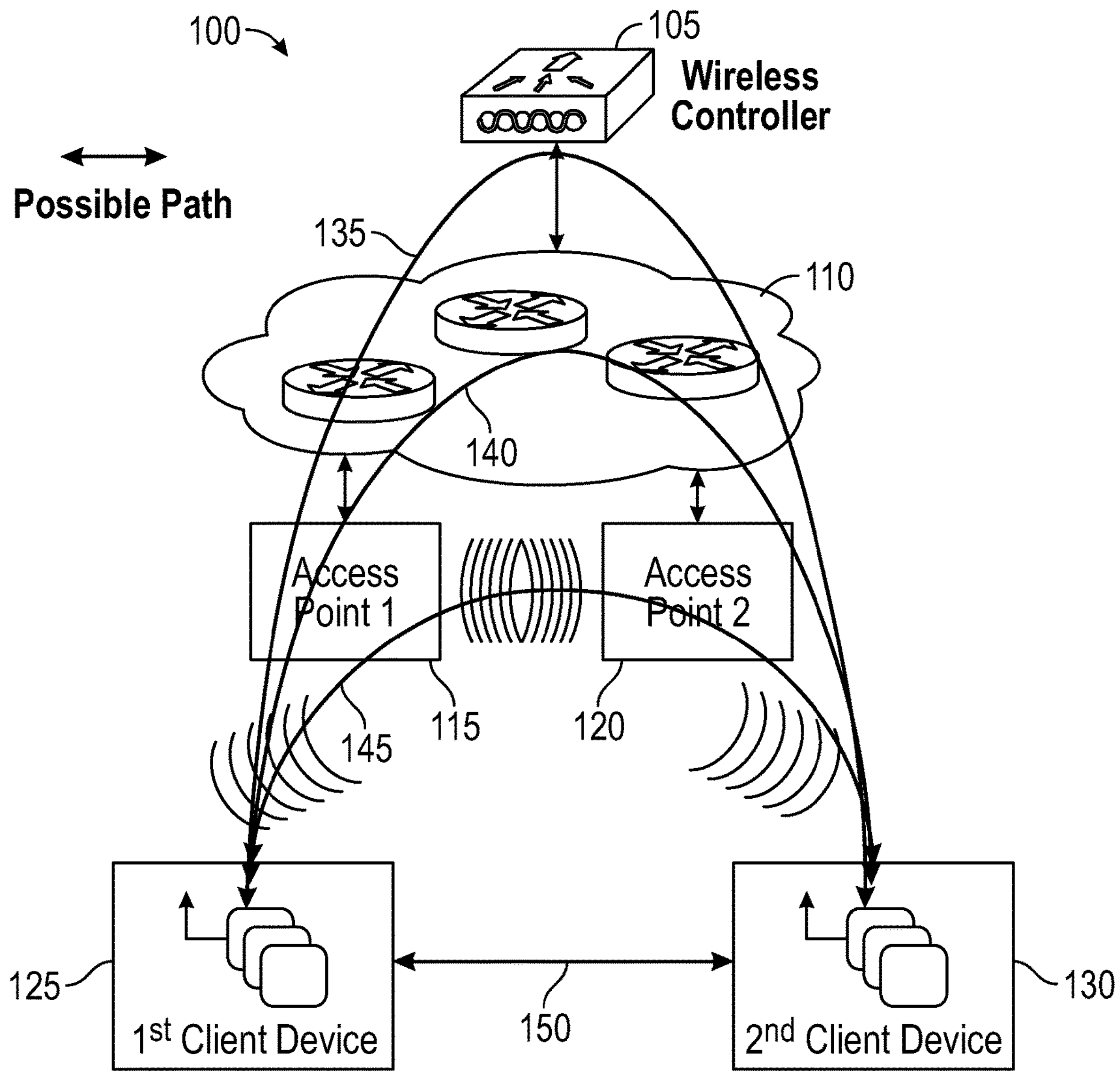
FIG. 1 is a block diagram of an operating environment for leveraging wireless direct transmissions.

Leveraging wireless direct transmissions may be provided. It may be determined that data traffic flowing on a first pathway between a first client device and a second client device is not meeting a predetermined service level. The first pathway may be partially wired and partially wireless. A second pathway that will meet the predetermined service level may be determined. The second pathway may be wireless. The data traffic may be caused to flow on the second pathway.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When a client device communicates with another client device, even if they are close enough, packets in the traffic flow may need to transit over a wired portion of a network, possibly all the way to a controller, and back to a wireless portion of the network. This may make the transmission reliable, but may significantly augment latency (e.g., and possibly jitter). In a controlled environment where determinism may be the end goal, such delay variation may cause the wireless (e.g., Wi-Fi) option to be discarded in favor of other more deterministic processes.

A solution may be achieved if the APs that serve the client devices are in line of sight and may communicate to one another over the air. This transmission may be less reliable, but may be more direct and may save overall resources in the fabric network. With multi-radio APs, this solution may be possible. If AP to AP bypass is enabled, it may become possible to use either a wired path via the fabric network/controller, a wireless path (e.g., a first client device to a first AP to a second AP to a second client device), or both for redundancy. Furthermore, if both client devices are close enough, direct client device to client device connections may be established in an ad hoc mode for certain types of traffic (e.g., low latency/jitter). However, this communication mode may not be an exclusive option (i.e., direct or via the APs).

Accordingly, embodiments of the disclosure, may detect critical traffic with the traffic not meeting a set of requirements (e.g., Service Level Agreement (SLA) requirements) that may benefit from client device to client device communication. Embodiments of the disclosure may explore different paths to satisfy, for example, either high reliability or low latency traffic leveraging direct client device to client device communication or via their respective AP and leveraging AP to AP communications.

FIG. 1 shows an operating environment 100 for leveraging wireless direct transmissions. As shown in FIG. 1, operating environment 100 may comprise a wireless controller 105 controlling a coverage environment and a fabric network 110. Fabric network 110 may comprise, for example, a plurality of network devices (e.g., switches and routers). The coverage environment may comprise, but is not limited to, a Wireless Local Area Network (WLAN) comprising a plurality of Access Points (APs) that may provide wireless network access (e.g., access to the WLAN for client devices). The plurality of APs may comprise a first AP 115 and a second AP 120. The plurality of APs may provide wireless network access to a plurality of client devices as they move within the coverage environment. The plurality of client devices may comprise, but are not limited to, a first client device 125 (i.e., a first Station (STA)) and a second client device 130 (i.e., a second Station (STA)). Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control the coverage environment (e.g., a WLAN). Controller 105 may allow first client device 125 and second client device 130 to join the coverage environment. In some embodiments of the disclosure, controller 105 may be implemented by a Digital Network Architecture Center (DNAC) controller (i.e., a Software-Defined Network (SDN) controller) that may configure information for the coverage environment in order to provide leveraging of wireless direct transmissions.

Operating environment 100 may comprise a plurality of paths. The plurality of paths may comprise a first path 135, a second path 140, a third path 145, and a fourth path 150. First path 135 may pass through first AP 115, second AP 120, fabric network 110, and controller 105. Because first path 135 may pass through fabric network 110 and controller 105, it may be considered a wired path. Second path 140 may pass through first AP 115, second AP 120, and fabric network 110. Because second path 140 may pass through fabric network 110, it may also be considered a wired path.

Third path 145 may pass through first AP 115 and second AP 120, but not fabric network 110 or controller 105. Because third path 145 may not pass through fabric network 110 or controller 105, it may be considered a wireless path. Fourth path 150 may pass directly between first client device 125 and second client device 130, but not fabric network 110 or controller 105. Because fourth path 150 may not pass through fabric network 110 or controller 105, it may be considered a wireless path.

Other wireless paths may exist. For example, a wireless path may exist between first client device 125 and second client device 130 through first AP 115 when both are associated with first AP 115. Similarly, a wireless path may exist between first client device 125 and second client device 130 through second AP 120 when both are associated with second AP 120. A relay client device may exist in fourth path 145 to relay traffic between first client device 125 and second client device 130 to provide a wireless path.

The elements described above of operating environment 100 (e.g., controller 105, first AP 115, second AP 120, first client device 125, and second client device 130) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
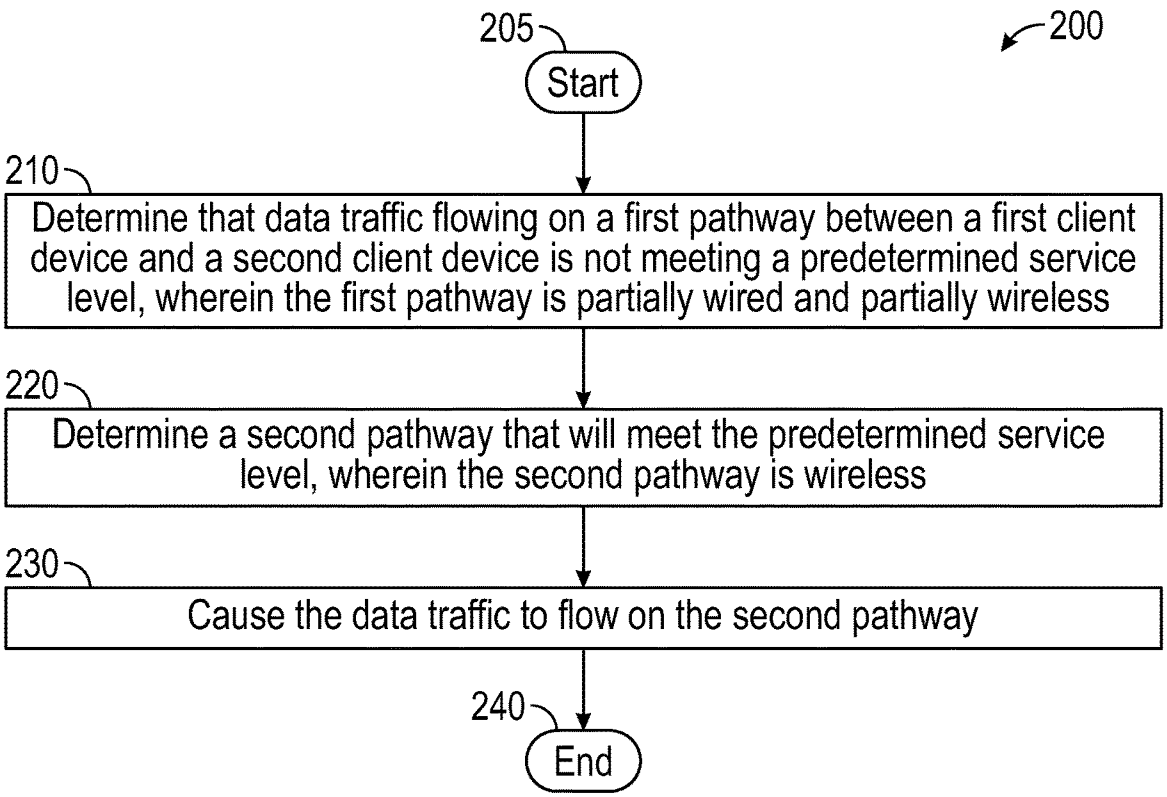
FIG. 2 is a flow chart of a method for leveraging wireless direct transmissions.

FIG. 2 is a flow chart setting forth the general stages involved in a method 200 consistent with embodiments of the disclosure for leveraging wireless direct transmissions. Method 200 may be implemented using a computing device 300 as described in more detail below with respect to FIG. 3. Ways to implement the stages of method 200 will be described in greater detail below.

Method 200 may begin at starting block 205 and proceed to stage 210 where computing device 100 may determine that data traffic flowing on a first pathway between first client device 125 and second client device 130 may not meet a predetermined service level. The first pathway may be partially wired and partially wireless. For example, the first pathway may comprise first path 135 or second path 140. The predetermined service level may be defined by a Service Level Agreement (SLA). The SLA may define Mean Time Between Failures (MTBF), Mean Time To Repair or Mean Time To Recovery (MTTR), may identify which party is responsible for reporting faults or paying fees, may define responsibility for various data rates, may define throughput, may define jitter, or similar measurable details.

From stage 210, where computing device 100 determines that data traffic flowing on the first pathway between first client device 125 and second client device 130 may not meet the predetermined service level, method 200 may advance to stage 220 where computing device 100 may determine a second pathway that may meet the predetermined service level. The second pathway may be wireless. For example, the second pathway may comprise third path or fourth path.

In a factory-type environment, for example, it may be common that a working zone covers a Basic Service Set (BSS) of two APs that become a working zone pair. It may also be common that one client device (e.g., first client device 125) may primarily send latency and jitter-sensitive data to a second client device (e.g., second client device 130), while the return traffic may be less latency and jitter sensitive (e.g., because it may be control traffic, Acknowledgements (ACKs), keepalives, status or analytics, etc.). Accordingly, with embodiments of the disclosure, wireless controller 105 may recognize first client device 125 to second client device 130 communication when both endpoints of a Layer-2 (L2) communication are associated through their respective AP, both connected to the controller.

Controller 105 may also be aware of the client device's respective APs (e.g., first AP 115 and second AP 130), and through radio resource management (e.g., Neighbor Discovery Protocol (NDP) messages between APs at intervals), it may know if the quality of the air communication between the APs is good enough for direct transmission. If so, controller 105 may push bypass instructions to the AP for the pair of communicating client devices. The bypass instructions may tell the APs to either move or copy the frames over the air to bypass or speed up the transmission. In the latter case, replication and elimination may take place at first AP 115 and second AP 120 respectively, whereby first AP 115 may tag the copies of the same frame over the air and over the wire with the same tag, and second AP 120 may eliminate the second copy with the same tag.

In an embodiment, controller 105 may recognize the direction of primary traffic (e.g., based on traffic volume, pace, or type), for example, first client device 125 to first AP 115 to second AP to second client device 130. Controller 105 may then instruct second AP 120 to switch its monitor radio to the channel of one of first AP 115's radios (e.g., the same radio as first client device 125's BSS or another). First AP 115 may then replicate or move the traffic received from first client device 125 as above, over the wire and over the first AP 115 to second AP 120 Over-the-Air (OTA) link (or only OTA). The return traffic may follow the regular Down Stream (DS) path. In another embodiment, first AP 115 may also set its monitor radio to the first AP 115 to second AP 120 channel, and both directions may use the OTA path.

Controller 105 may also check whether first client device 125 can reach second AP 120 using MLO. This check may be done passively, by detecting the client device capabilities (e.g., MLO) and the probes on second AP 120, or may take the form of an 11 k neighbor report request to the client device. If so, controller 105 may instruct first client device 125 to associate to second AP 120 (e.g., this may be a new action frame, for example, derived from 802.11v BSS Transition Management (BTM)) and may provide forwarding preferences so first client device 125 uses second AP 120 when talking to second client device 130 (e.g., this may be a new action frame, for example, derived from the Differentiated Service Code Point (DSCP) policy action frame, where the target becomes second client device 130's Media Access Control). This way, second AP 120 may forward to second client device 130 over the air and the wire may be bypassed. The same process may occur for second client device 130's responses, sent through first AP 115 and MLO.

In another embodiment, first AP 115 may select either over-the-air or over-the-wire transmission for a given frame based on the prediction of success for over-the-air. After a few retries without an acknowledgment, first AP 115 may fall back to over-the-wire transmission. Similarly, and in another embodiment, first client device 125 using MLO to second AP 120 may measure its retry rate over this link, and start duplicating traffic to first AP 115, or switching to first AP 115 entirely, when its retry rate to second AP 120 exceeds a configurable retry threshold.

In another embodiment, an engine may perform a process to determine that some client device to client device traffic may require low latency. Such an engine may be co-located in wireless controller 105 or in the APs. The process may be descried as follows. First, the process may identify a subset of client devices capable of MLO. Then select all client devices with traffic sensitive to delay and jitter. A local policy engine may be used to list all "critical" applications (i.e., requiring low latency (e.g., AR/VR) or other deterministic traffic). This may be performed by activating Deep Packet Inspection (DPI) for the traffic going through the AP/controller 105 and by monitoring the SLA for the traffic for example. Then, for each pair of client devices <STAi, STAj> endowed with the MLO capability and carrying critical traffic, activate an SLA monitoring process in charge of monitoring the traffic SLA between the pair of client devices. In an embodiment, a set of conditions may be used (e.g., minimum amount of traffic, time of day) and a performance template (e.g., maximum of x % of critical traffic violating the SLA is acceptable). If the above conditions are met, the engine may start a process by which other potential client devices may relay the offended traffic between STAi and STAj (e.g., equipped with MLO) by using one radio in ad hoc mode. A selection process may be used to elect the client device that may be used to relay the traffic between STAi and STAj. Using the information gathered from the Radio Resource Management (RRM), the engine may select the client device that may be likely to optimize the client device to client device delay or satisfy the delay (and jitter) requirements while optimizing the probability of a successful transmission. Next, a signal may be sent to STAi and STAj requesting to send the critical traffic via STAk, and to STAk to operate in ad hoc mode for the traffic between STAi and STAj. STAk may be expected to be MLO-capable and associated to the same BSS as STAi. Thus first AP 115 may send to STAk a request to relay that may be an action frame derived from Direct Link Setup (DLS). In its response, STAk may confirm reachability to second AP 120 or to STAj and may start relaying traffic. STAk may also have its own traffic to transmit and receive.

Communicating directly between first client device 125 and second client device 130 may comprise a Device to Device (D2D) mode. In another embodiment the engine may deactivate the D2D mode upon detecting the lack of critical traffic between STAi and STAj. The engine may also start "trial" periods requesting STAi to switch back to the previous mode (with traffic transiting via the AP, controller, switching fabric) so as to check whether the D2D should be maintained or not.

A signaling may be specified that may allow the "relay" client device (STAk) to stop acting as a relay for the traffic between STAi and STAj should the second radio be requested for other usage. In one embodiment, STAk may use an action frame derived from DLS to terminate its role as relay. In another embodiment, STAk may use an action frame derived from 802.11 be Stream Classification Service (SCS) (QoS management) to request a limit on its relay-role (e.g., in terms of frame size and pace).

In yet another embodiment, the D2D mode may be activated according to predicted critical traffic between STAi and STAj for which the engine predicts that the SLA may not be met. To that end, "Predictive Networks" may be used to predict the existence of critical traffic and the high probability of SLA violation. In such a mode, the engine may send a signal to the relay client device with a schedule to indicate when the D2D mode should be activated according to the prediction. Similar to above, this message may be an extension to 802.11 be SCS (QoS management), where the targeted traffic may be represented and characterized, along with the destination client device or AP, and channel.

Once computing device 100 determines the second pathway that may meet the predetermined service level in stage 220, method 200 may continue to stage 230 where computing device 100 may cause the data traffic to flow on the second pathway. Once computing device 100 causes the data traffic to flow on the second pathway in stage 230, method 200 may then end at stage 240.

Figure 3:
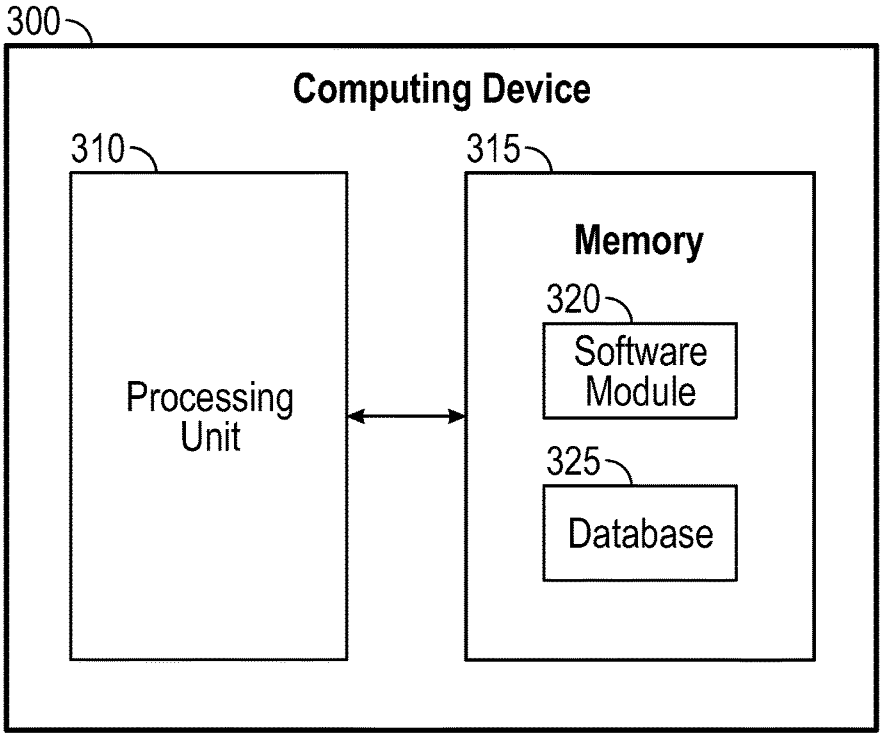
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing leveraging of wireless direct transmissions as described above with respect to FIG. 2 and FIG. 3. Computing device 300, for example, may provide an operating environment for controller 105, first AP 115, second AP 120, first client device 125, and second client device 130. Controller 105, first AP 115, second AP 120, first client device 125, and second client device 130 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

determining that data traffic flowing on a first pathway between a first client device and a second client device is not meeting a predetermined service level, wherein the first pathway between the first client device and the second client device is partially wired and partially wireless, and wherein the first pathway between a first client device and a second client device passes through a first Access Point (AP) and a fabric network;

determining a second pathway between the first client device and the second client device that will meet the predetermined service level, wherein the second pathway between a first client device and a second client device is wireless and bypasses the fabric network; and causing the data traffic to flow on the second pathway, wherein causing the data traffic to flow on the second pathway comprises sending a bypass instruction to move the data traffic to the second pathway between the first client device and the second client device, wherein the second pathway bypasses forwarding through the fabric network, and wherein return traffic between the first client device and the second client device follows the first pathway.

2. The method of claim 1, wherein the second pathway comprises a wireless path directly between the first client device and the second client device.

3. The method of claim 1, wherein a portion of the second pathway comprises a wireless path between a first Access Point (AP) to which the first client device is associated and a second AP to which the second client device is associated.

4. The method of claim 1, wherein the second pathway comprises a wireless path between a first Access Point (AP) to which the first client device is associated and a wireless path between the first AP to which the second client device is associated.

5. The method of claim 1, wherein the second pathway comprises a wireless path between the first client device and the second client device passing through a relay client device.

6. The method of claim 1, wherein the predetermined service level comprises a predetermined reliability level.

7. The method of claim 1, wherein the predetermined service level comprises a predetermined latency level.

8. The method of claim 1, wherein the first pathway passes through a wireless controller.

9. The method of claim 1, wherein the first pathway passes through network routers without passing through a wireless controller.

10. A system comprising:

a memory storage; and a processing unit coupled to the memory storage, wherein the processing unit is operative to:

determine that data traffic flowing on a first pathway between a first client device and a second client device is not meeting a predetermined service level, wherein the first pathway between the first client device and the second client device is partially wired and partially wireless, and wherein the first pathway between a first client device and a second client device passes through a first AP and a fabric network;

determine a second pathway between the first client device and the second client device that will meet the predetermined service level, wherein the second pathway between a first client device and a second client device is wireless and bypasses the fabric network; and cause the data traffic to flow on the second pathway, wherein the processing unit being operative to cause the data traffic to flow on the second pathway comprises the processing unit being operative to send a bypass instruction to move the data traffic to the second pathway between the first client device and the second client device, wherein the second pathway bypasses forwarding through the fabric network, and wherein return traffic between the first client device and the second client device follows the first pathway.

11. The system of claim 10, wherein the second pathway comprises a wireless path directly between the first client device and the second client device.

12. The system of claim 10, wherein a portion of the second pathway comprises a wireless path between a first Access Point (AP) to which the first client device is associated and a second AP to which the second client device is associated.

13. The system of claim 10, wherein the second pathway comprises a wireless path between a first Access Point (AP) to which the first client device is associated and a wireless path between the first AP to which the second client device is associated.

14. The system of claim 10, wherein the second pathway comprises a wireless path between the first client device and the second client device passing through a relay client device.

15. A non-transitory computer-readable medium that stores a set of instructions which when executed perform a method executed by the set of instructions comprising:

determining that data traffic flowing on a first pathway between a first client device and a second client device is not meeting a predetermined service level, wherein the first pathway between the first client device and the second client device is partially wired and partially wireless, and wherein the first pathway between a first client device and a second client device passes through a first AP and a fabric network;

determining a second pathway between the first client device and the second client device that will meet the predetermined service level, wherein the second pathway between a first client device and a second client device is wireless and bypasses the fabric network; and causing the data traffic to flow on the second pathway, wherein causing the data traffic to flow on the second pathway comprises sending a bypass instruction to move the data traffic to the second pathway between the first client device and the second client device, wherein the second pathway bypasses forwarding through the fabric network, and wherein return traffic between the first client device and the second client device follows the first pathway.

16. The non-transitory computer-readable medium of claim 15, wherein the second pathway comprises a wireless path directly between the first client device and the second client device.

17. The non-transitory computer-readable medium of claim 15, wherein a portion of the second pathway comprises a wireless path between a first Access Point (AP) to which the first client device is associated and a second AP to which the second client device is associated.

18. The non-transitory computer-readable medium of claim 15, wherein the second pathway comprises a wireless path between a first Access Point (AP) to which the first client device is associated and a wireless path between the first AP to which the second client device is associated.

19. The non-transitory computer-readable medium of claim 15, wherein the second pathway comprises a wireless path between the first client device and the second client device passing through a relay client device.

20. The non-transitory computer-readable medium of claim 15, wherein the predetermined service level comprises at least one of a predetermined reliability level and a predetermined latency level.

* * * * *